United States Patent
Osuka et al.

(10) Patent No.: US 9,267,573 B2
(45) Date of Patent: Feb. 23, 2016

(54) MANUAL TRANSMISSION

(75) Inventors: Shinya Osuka, Nishio (JP); Yuki Masui, Okazaki (JP); Toshio Tanba, Kariya (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 57 days.

(21) Appl. No.: 14/005,835

(22) PCT Filed: May 16, 2012

(86) PCT No.: PCT/JP2012/062491
§ 371 (c)(1),
(2), (4) Date: Sep. 18, 2013

(87) PCT Pub. No.: WO2012/161045
PCT Pub. Date: Nov. 29, 2012

(65) Prior Publication Data
US 2014/0007721 A1    Jan. 9, 2014

(30) Foreign Application Priority Data

May 25, 2011    (JP) .................................. 2011-116491

(51) Int. Cl.
*F16H 3/08* (2006.01)
*B60K 6/48* (2007.10)
(Continued)

(52) U.S. Cl.
CPC .. *F16H 3/08* (2013.01); *B60K 6/48* (2013.01); *B60L 3/0061* (2013.01); *B60L 11/14* (2013.01);
(Continued)

(58) Field of Classification Search
CPC .. B60K 2006/4841; B60K 6/48; B60L 15/20; B60L 1/14; F16H 63/3013; F16H 2063/3076; F16H 2063/3079; B60W 10/08; B60W 20/30; B60W 20/40

USPC ............ 74/325, 329, 335, 336 R, 661, 665 B, 74/665 A; 180/65.285
See application file for complete search history.

(56) References Cited

U.S. PATENT DOCUMENTS 4,621,536 A * 11/1986 Takeuchi ...................... 74/473.1
6,341,541 B1 * 1/2002 Sakamoto et al. .......... 74/665 A
(Continued)

FOREIGN PATENT DOCUMENTS

EP    1 232 891 A1    8/2002
EP    2 653 364 A1    10/2013
(Continued)

OTHER PUBLICATIONS

Extended European Search Report, European Application No. 12788909.5, dated May 19, 2015 (8 pages).
(Continued)

*Primary Examiner* — William Kelleher
*Assistant Examiner* — Thomas Magnuson
(74) *Attorney, Agent, or Firm* — Burr & Brown, PLLC

(57) ABSTRACT

This manual transmission includes a connection changeover mechanism which changes the state of connection between the output shafts of the motor generator and the transmission in accordance with a gear stage established by a driver's shift lever operation. When a gear stage for low speed travel is established, a power transmission system is established between the output shafts of the motor generator and the transmission, and the motor speed reduction ratio is set to a first speed reduction ratio. When a gear stage for intermediate speed travel is established, a power transmission system is established between the output shafts of the motor generator and the transmission, and the motor speed reduction ratio is set to a second speed reduction ratio. When a gear stage for high speed travel is established, no power transmission system is established between the output shafts.

2 Claims, 15 Drawing Sheets

(51) Int. Cl.
*B60L 3/00* (2006.01)
*B60L 11/14* (2006.01)
*B60L 15/20* (2006.01)
*F16H 63/36* (2006.01)
*F16H 3/089* (2006.01)

(52) U.S. Cl.
CPC ............... *B60L 15/20* (2013.01); *F16H 63/36* (2013.01); *B60K 2006/4808* (2013.01); *B60K 2006/4841* (2013.01); *B60L 2210/40* (2013.01); *B60L 2220/14* (2013.01); *B60L 2240/36* (2013.01); *B60L 2240/421* (2013.01); *B60L 2240/423* (2013.01); *B60L 2240/486* (2013.01); *B60Y 2400/71* (2013.01); *F16H 3/089* (2013.01); *F16H 2200/0043* (2013.01); *Y02T 10/626* (2013.01); *Y02T 10/6221* (2013.01); *Y02T 10/642* (2013.01); *Y02T 10/70* (2013.01); *Y02T 10/7077* (2013.01); *Y02T 10/7241* (2013.01); *Y02T 10/7275* (2013.01); *Y10T 74/19251* (2015.01)

(56) References Cited

U.S. PATENT DOCUMENTS

| | | | |
|---|---|---|---|
| 6,640,917 B2 * | 11/2003 | Maruyama | 180/65.6 |
| 2010/0234169 A1 | 9/2010 | Miyazaki et al. | |
| 2010/0242657 A1 * | 9/2010 | Shintani et al. | 74/473.24 |

FOREIGN PATENT DOCUMENTS

| | | |
|---|---|---|
| JP | 2000-224710 A1 | 8/2000 |
| JP | 2004-161053 A1 | 6/2004 |
| JP | 2004-306646 A1 | 11/2004 |
| JP | 2007-055439 A1 | 3/2007 |
| JP | 2010-254014 AI | 11/2010 |

OTHER PUBLICATIONS

International Search Report and Written Opinion dated Jul. 31, 2012.

* cited by examiner

POSITION FOR EV
POSITION FOR 2-ND
(POSITION FOR R)

POSITION FOR 2-ND

POSITION FOR 4-TH

POSITION FOR 5-TH

POSITION FOR 5-TH

MANUAL TRANSMISSION

BACKGROUND OF THE INVENTION

1. Field of the Invention

The present invention relates to a manual transmission applied to a vehicle which has an internal combustion engine and an electric motor as power sources, and more particularly to a manual transmission applied to a vehicle which includes a friction clutch disposed between the output shaft of the internal combustion engine and the input shaft of the manual transmission.

2. Description of Related Art

Conventionally, there has been widely known a so-called hybrid vehicle which includes an engine and an electric motor as power sources (see, for example, Japanese Patent Application Laid-Open (kokai) No. 2000-224710). In such a hybrid vehicle, there can be employed a structure in which the output shaft of the motor is connected to one of the output shaft of the internal combustion engine, the input shaft of a transmission, and the output shaft of the transmission. In the following description, drive torque from the output shaft of the internal combustion engine will be referred to as "engine drive torque," and drive torque from the output shaft of the motor as "motor drive torque."

In recent years, there has been developed a power transmission control apparatus applied to a hybrid vehicle which includes a manual transmission and a friction clutch (hereinafter referred to as an "HV-MT vehicle"). The term "manual transmission" used herein refers to a transmission which does not include a torque converter and whose gear stage is selected in accordance with the shift position of a shift lever operated by a driver (the manual transmission is denoted by MT). Also, the term "friction clutch" used herein refers to a clutch which is interposed between the output shaft of the internal combustion engine and the input shaft of the manual transmission and which is configured such that the engagement state of a friction plate changes in accordance with the operation quantity of a clutch pedal operated by the driver.

SUMMARY OF THE INVENTION

Here, there is assumed a manual transmission for an HV-MT vehicle which has an "input shaft to which power is input from an internal combustion engine (through a clutch)" and an "output shaft to which power is input from an electric motor." In this manual transmission, motor drive torque can be arbitrarily transmitted to the output shaft of the manual transmission (accordingly, to drive wheels) irrespective of whether or not a power transmission system is established between the input shaft and the output shaft.

Incidentally, demand has arisen for increasing the ratio of rotational speed of the output shaft of the motor generator to that of the output shaft of the transmission (motor speed reduction ratio) at the time of low speed travel (namely, when a gear stage for low speed travel is selected). When the motor speed reduction ratio is increased, the motor generator drive torque is transmitted to the output shaft of the manual transmission (accordingly, drive wheels) after being amplified. Therefore, the size of the motor generator can be reduced.

Also, demand has arisen for interrupting the power transmission system between the output shaft of the motor generator and the output shaft of the manual transmission at the time of high speed travel (namely, when a gear stage for high speed travel is selected). This can suppress the generation of heat by the motor generator due to high speed rotation of the output shaft of the motor generator. Demand has arisen for development of a manual transmission which can meet these demands.

An object of the present invention is to provide a manual transmission for an HV-MT vehicle which includes an output shaft to which drive torque is transmitted from a motor and which can reduce the size of the motor and can suppress heat generation of the motor due to high speed rotation of the motor.

A manual transmission according to the present invention comprises an input shaft to which power is input from the internal combustion engine; an output shaft to which power is input from the motor and from which power is output to a drive wheel of the vehicle; and a transmission speed change mechanism.

When a shift operation member is moved, on a shift pattern, to each of shift completion positions of a plurality of gear stages (other than neutral), the transmission speed change mechanism establishes the corresponding gear stage. In each gear stage, a power transmission system may be or may not be established between the input and output shafts. An example of the gear stage in which no power transmission system is established between the input and output shafts is a gear stage for EV travel (travel which uses the motor drive torque only). In the gear stages in which a power transmission system is established between the input and output shafts, the "transmission speed reduction ratio" is set to a value corresponding to the corresponding gear stage.

The transmission speed change mechanism has, as the above-described gear stage for low speed travel, a single gear stage for EV travel in which no power transmission system is established between the input shaft of the transmission and the output shaft of the transmission. The transmission speed change mechanism has, as the above-described gear stage for intermediate speed travel, one or a plurality of gear stages for hybrid (HV) travel (travel which uses both of drive force of the internal combustion engine (E/G) and drive force of the motor generator (M/G)) in which a power transmission system is established between the input shaft of the transmission and the output shaft of the transmission. The transmission speed change mechanism has, as the above-described gear stage for high speed travel, a single gear stage for I-IV EG travel in which a power transmission system is established between the input shaft of the transmission and the output shaft of the transmission and the "transmission speed reduction ratio" is smaller as compared with the gear stage for intermediate speed travel.

The feature of the manual transmission of the present invention is provision of a connection changeover mechanism. In the connection changeover mechanism, when, among the plurality of gear stages, the gear stage for low speed travel is established, a power transmission system is established between the output shaft of the transmission and the output shaft of the motor generator M/G and the "motor speed reduction ratio" is set to a first speed reduction ratio. When, among the plurality of gear stages, the gear stage for intermediate speed travel which is used for traveling at higher speed as compared with the gear stage for low speed travel is established, a power transmission system is established between the output shaft of the transmission and the output shaft of the motor generator M/G and the "motor speed reduction ratio" is set to a second speed reduction ratio smaller than the first speed reduction ratio. When, among the plurality of gear stages, the gear stage for high speed travel which is used for traveling at higher speed as compared with the gear stage for intermediate speed travel is established, no power transmission system is established between the output shaft of the transmission and the output shaft of the motor generator M/G.

According to the above-described configuration, at the time of low speed travel (namely, when the gear stage for low speed travel is selected), the "motor speed reduction ratio" can be set to a larger value. Accordingly, the size of the motor generator M/G can be reduced. At the time of high speed travel (namely, when the gear stage for high speed travel is selected), the power transmission system between the output shaft of the motor generator M/G and the output shaft of the manual transmission is interrupted. Accordingly, heat generation of the motor generator M/G due to high speed rotation of the motor generator M/G can be suppressed.

DETAILED DESCRIPTION OF THE INVENTION

Figure 1:
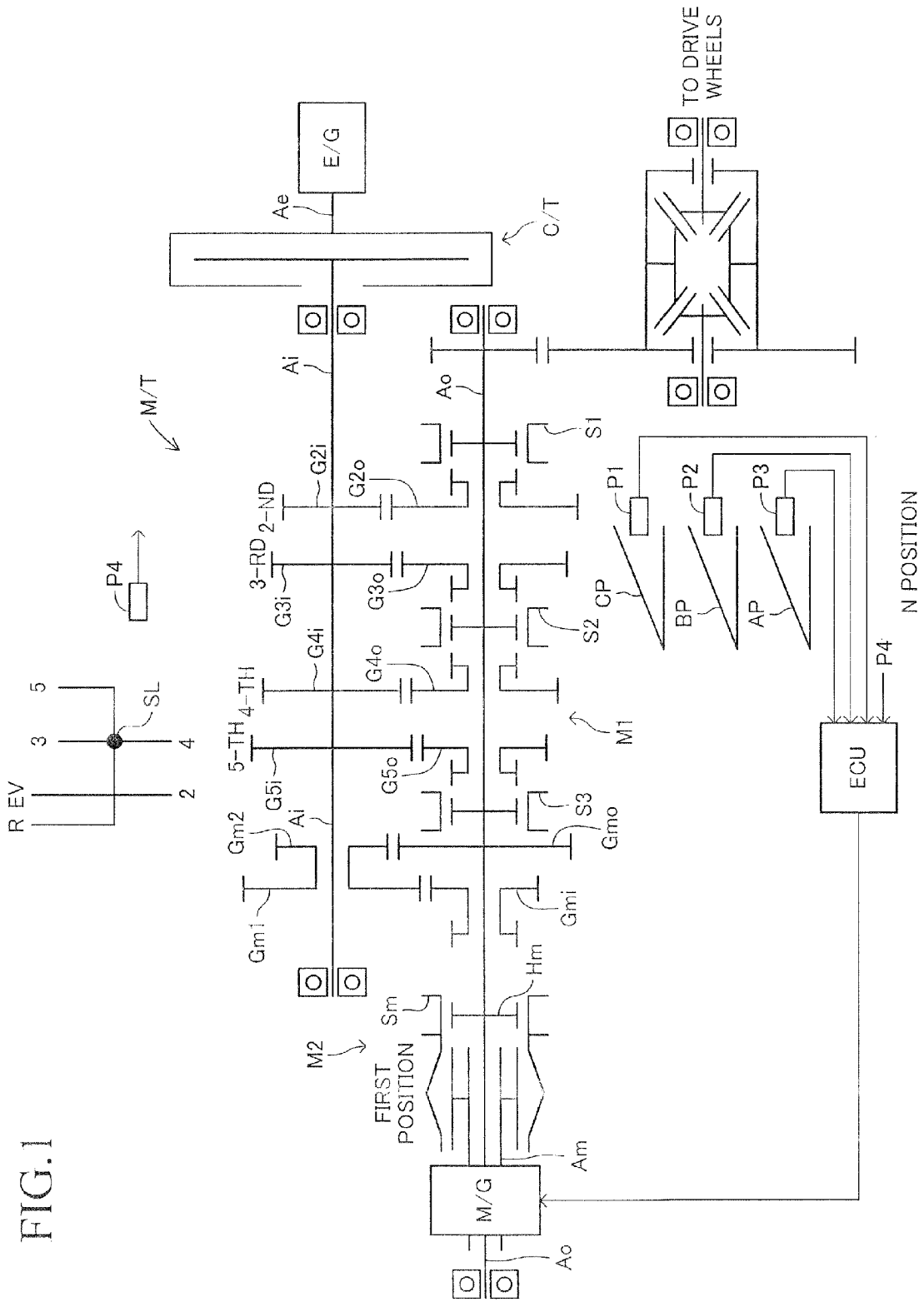
FIG. 1 is a schematic diagram of a power transmission control apparatus which includes a manual transmission for an HV-MT vehicle according to an embodiment of the present invention in a state in which an N position is selected.

An example of a power transmission control apparatus of a vehicle which includes a manual transmission M/T according to an embodiment of the present invention (hereinafter referred to as the "present apparatus") will now be described with reference to the drawings. As shown in FIG. 1, the present apparatus is applied to a "vehicle which includes an engine E/G and a motor generator M/G as power sources, and also includes a manual transmission M/T, which does not include a torque converter, and a friction clutch C/T; i.e., "the above-described "HV-MT vehicle." This "HV-MT vehicle" may be a front wheel drive vehicle, a rear wheel drive vehicle, or a four wheel drive vehicle.

(Overall Structure)

First, the overall structure of the present apparatus will be described. The engine E/G is a well known internal combustion engine, such as a gasoline engine which uses gasoline as fuel, or a diesel engine which uses light oil as fuel.

The manual transmission M/T is a transmission which does not include a torque converter and whose gear stage is selected in accordance with the shift position of a shift lever SL operated by a driver. The manual transmission M/T has an input shaft Ai to which power is input from an output shaft Ae of the engine E/G, an output shaft Ao from which power is output to drive wheels of the vehicle, and an MG shaft Am to which power is input from the motor generator M/G. The input shaft Ai, the output shaft Ao, and the MG shaft Am are disposed parallel with one another. In the example shown in FIG. 1, the MG shaft Am is coaxial with the output shaft Ao. The MG shaft Am may be coaxial with the input shaft Ai. The details of the structure of the manual transmission M/T will be described later.

The friction clutch C/T is disposed between the output shaft Ae of the engine E/G and the input shaft Ai of the manual transmission M/T. The friction clutch C/T is a well known clutch configured such that the engagement state of a friction plate (more specifically, the axial position of a friction plate, which rotates together with the input shaft Ai, in relation to a fly-wheel, which rotates together with the output shaft Ae) changes in accordance with an operation quantity (depression amount) of a clutch pedal CP operated by the driver.

The engagement state of the friction clutch C/T (the axial position of the friction plate) may be mechanically adjusted in accordance with the operation quantity of the clutch pedal CP, by making use of a link mechanism or the like which mechanically connects the clutch pedal CP to the friction clutch C/T (the friction plate). Alternatively, the engagement state of the friction clutch C/T may be electrically adjusted by making use of drive force of an actuator which operates in accordance with the result of detection by a sensor (a sensor P1 to be described later) which detects the operation quantity of the clutch pedal CP (by a so-called by-wire scheme).

The motor generator M/G has a well known structure (e.g., an AC synchronous motor), and its rotor (not illustrated) rotates together with the MG shaft Am. In the following description, drive torque from the output shaft Ae of the engine E/G will be referred to as "EG torque," and drive torque from the MG shaft Am (torque of the output shaft of the motor generator M/G) as "MG torque."

The present apparatus includes a clutch operation quantity sensor P1 which detects the operation quantity (depression amount, clutch stroke, etc.) of the clutch pedal CP, a brake operation quantity sensor P2 which detects the operation quantity (depression force, presence/absence of operation, etc.) of a brake pedal BP, an accelerator operation quantity sensor P3 which detects the operation quantity (accelerator opening) of an accelerator pedal AP, and a shift position sensor P4 which detects the position of the shift lever SL.

Moreover, the present apparatus includes an electronic control unit (hereinafter simply referred to as the "ECU"). On the basis of information, among others, from the above-mentioned sensors P1 to P4 and other sensors, etc., the ECU controls the EG torque by controlling the fuel injection amount of the engine E/G (opening of its throttle valve) and controls the MG torque by controlling an inverter (not shown).

(Structure of the Manual Transmission M/T)

The structure of the manual transmission M/T will be described with reference to FIGS. 1 to 4. As can be understood from the shift pattern of the shift lever SL shown in FIG. 1 and FIG. 4, in the present example, five forward gear stages (EV, 2-nd to 5-th) and a single reverse gear stage (R) are provided as selectable gear stages (shift completion positions). In the below, description regarding the reverse gear stage (R) is not provided.

Figure 4:
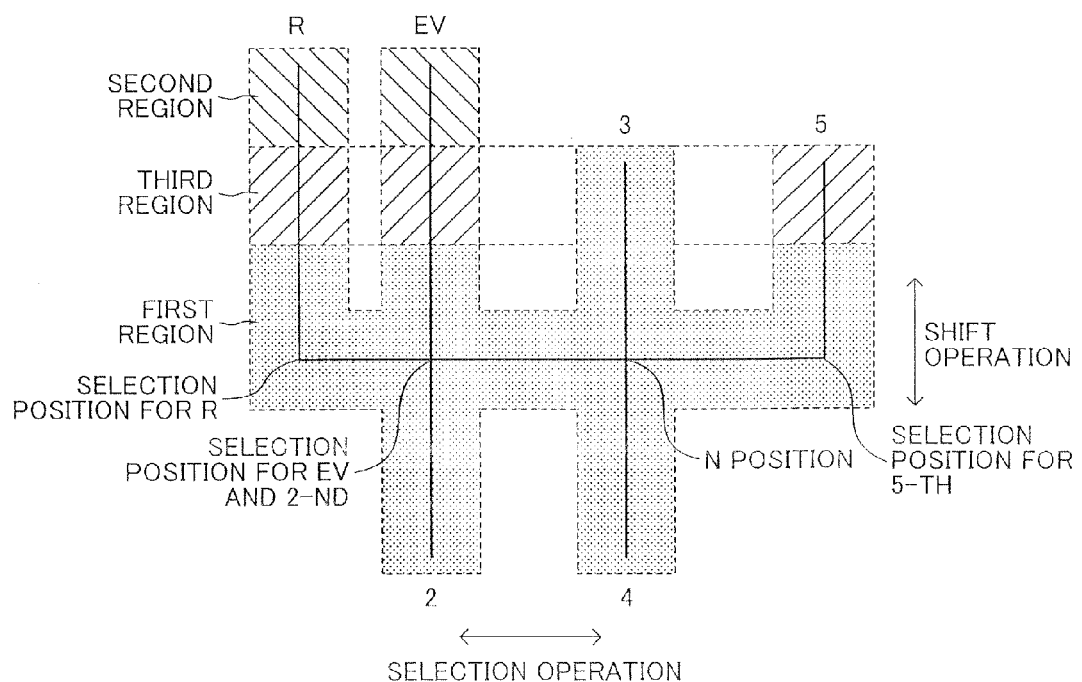
FIG. 4 is a diagram used for describing the relation between a shift pattern and first through third regions.

As shown in FIG. 4, on the shift pattern, an operation of the shift lever SL in the left-right direction of the vehicle will be referred to as a "selection operation," and an operation of the shift lever SL in the front-rear direction of the vehicle will be referred to as a "shift operation." As shown in FIG. 4, a "selection position for EV and 2-nd," an "N position" (or a "selection position for 3-rd and 4-th"), a "selection position for 5-th," and a "selection position for R" are defined on the shift pattern. Also, a range in which the shift lever SL can be moved by the selection operation (a range which extends in the left-right direction of the vehicle and which includes the "selection position for R," the "selection position for EV and 2-nd," the "N position," and the "selection position for 5-th") will be referred to as a "neutral range."

In the below, in order to facilitate the description, a state in which the MG shaft Am is connected to the output shaft Ao in a power transmissible manner (without mediation of the input shaft Ai) will be referred to as an "OUT connected state." Also, the "ratio of rotational speed of the input shaft Ai to that of the output shaft Ao" will be referred to as the "MT speed reduction ratio," and the ratio of rotational speed of the MG shaft Am to that of the output shaft Ao" will be referred to as the "MG speed reduction ratio."

The manual transmission M/T includes sleeves S1, S2, S3, and Sm. The sleeves S1, S2, and S3 are a sleeve for changeover to "2-nd," a sleeve for changeover between "3-rd and 4-th," and a sleeve for changeover to "5-th," which are fitted onto corresponding hubs which rotate together with the output shaft Ao such that the sleeves cannot rotate relative to the corresponding hubs but can move in the axial direction relative to the corresponding hubs. The sleeve Sm is a sleeve for changeover of the connection state of the MG shaft Am, which shaft is meshed with a gear rotating together with the MG shaft Am such that the sleeve cannot rotate relative to the gear but can move in the axial direction relative to the gear.

Figure 2:
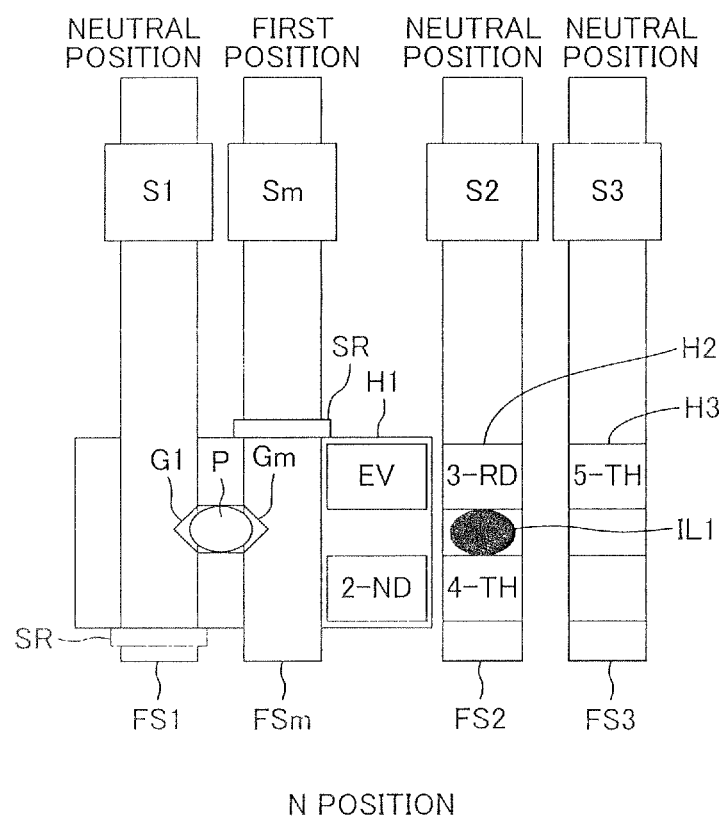
FIG. 2 is a schematic view of an S&S shaft and a plurality of fork shafts, as viewed in a direction orthogonal to the axial direction, which shows the positional relation between the S&S shaft and the fork shafts in a state in which the N position is selected.

As can be understood from FIG. 2, the sleeves S1, S2, S3, and Sm are unitarily connected to fork shafts FS1, FS2, and FS3 and a changeover shaft FSm, which are disposed parallel to one another. When a first inner lever IL1 or a second inner lever IL2 (see FIG. 3 in particular) provided on an S&S shaft interlocked with operation of the shift lever SL moves in the vertical direction of FIG. 2 (the left-right direction in FIG. 1) at the time of the shift operation, the shafts FS1, FS2, FS3, and FSm (i.e., the sleeves S1, S2, S3, and Sm) are selectively driven in the vertical direction of FIG. 2 (the left-right direction in FIG. 1) (the details will be described later).

Figure 3:
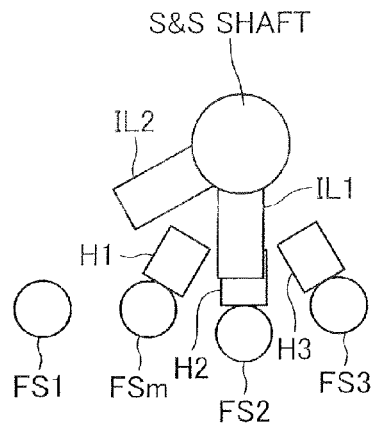
FIG. 3 is a schematic view of the S&S shaft and the plurality of fork shafts, as viewed in the axial direction, which shows the positional relation between the S&S shaft and the fork shafts in a state in which the N position, a position for 3-rd, or a position for 4-th is selected.

Notably, in FIGS. 2 and 3, the S&S shaft is a "selection rotation type" S&S shaft which is rotated about its axis as a result of the selection operation and is translated in the axial direction as a result of the shift operation. However, the S&S shaft may be a "shift rotation type" S&S shaft which is translated in the axial direction as a result of the selection operation and is rotated about its axis as a result of the shift operation.

(Changeover of the Connection State of the MG Shaft and Changeover of the Gear Stage)

In the below, changeover of the connection state of the MG shaft and changeover of the gear stage will be described with reference to FIGS. 1 to 16. As shown in FIG. 4, a "first region," a "second region," and a "third region" are defined on the shift pattern. The changeover of the connection state of the MG shaft Am (i.e., changing of the axial position of the sleeve Sm) is performed when the region to which the shift lever SL belongs changes among the first to third regions during the shift operation. In other words, the changeover of the connection state of the MG shaft Am (i.e., changing of the axial position of the sleeve Sm) is performed in synchronism with the changing of the gear stage.

<N Position>

FIGS. 1 to 3 show the state in which the shift lever SL is at the N position. In this state, all the fork shafts FS1, FS2, and FS3 (i.e., the sleeves S1, S2, and S3) are located at their "neutral positions" and the changeover shaft FSm (i.e., the sleeve Sm) is located at a "first position." An unillustrated engagement member restricts movement of the changeover shaft FSm from the "first position" toward the lower side in FIG. 2, and another unillustrated engagement member restricts movement of the fork shaft FS1 from the "neutral position" toward the upper side in FIG. 2.

As shown in FIG. 2, the fork shaft FS1 and the changeover shaft FSm, which are disposed parallel with each other, are inserted into corresponding through holes formed in a head H1 for EV and 2-nd (corresponding to the above-mentioned "movement member") such that the shafts are relatively movable in the axial direction (in the vertical direction of FIG. 2). A snap ring SR fixed to the changeover shaft FSm prevents the head H1 from moving upward in FIG. 2 relative to the changeover shaft FSm, and a snap ring SR fixed to the fork shaft FS1 prevents the head H1 from moving downward in FIG. 2 relative to the fork shaft FS1.

A pin P is inserted into the head H1 such that it can move in the left-right direction of FIG. 2. In the state shown in FIG. 2, the pin P can selectively engage with a groove G1 formed on the side surface of the fork shaft FS1 and a groove Gm formed on the side surface of the changeover shaft FSm.

As shown in FIG. 1, in this state, the sleeves S1, S2, and S3 do not engage with corresponding idle gears. Namely, in a state in which the shift lever SL is at the "N position" (more accurately, the neutral position), no power transmission system is established between the input and output shafts Ai and Ao.

Meanwhile, when the sleeve Sm is located at the "first position" as shown in FIG. 1, the sleeve Sm is in engagement with a hub Hm which rotates together with the output shaft Ao. As a result, a power transmission system (the "MG speed reduction ratio=1") is established between the MG shaft Am and the output shaft Ao. As described above, when the shift lever SL is located at the N position, more precisely, when the shift lever SL is located in the neutral range (the first region of FIG. 4), no power transmission system is established between the input and output shafts Ai and Ao, and the "OUT connected state" of the "MG speed reduction ratio=1" is established.

<Position for EV>

Figure 5:
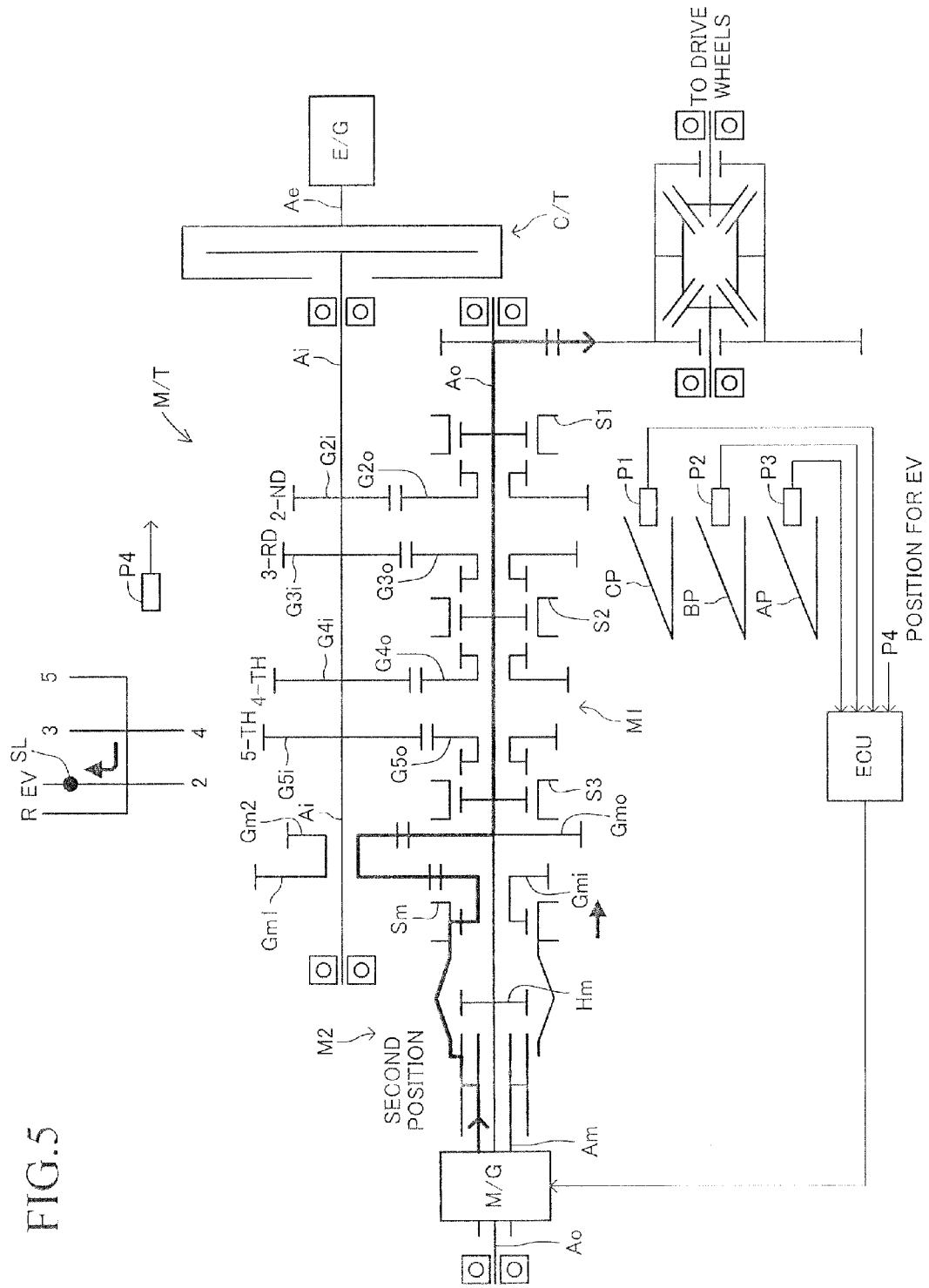
FIG. 5 is a diagram corresponding to FIG. 1 in a state in which a position for EV is selected.
Figure 6:
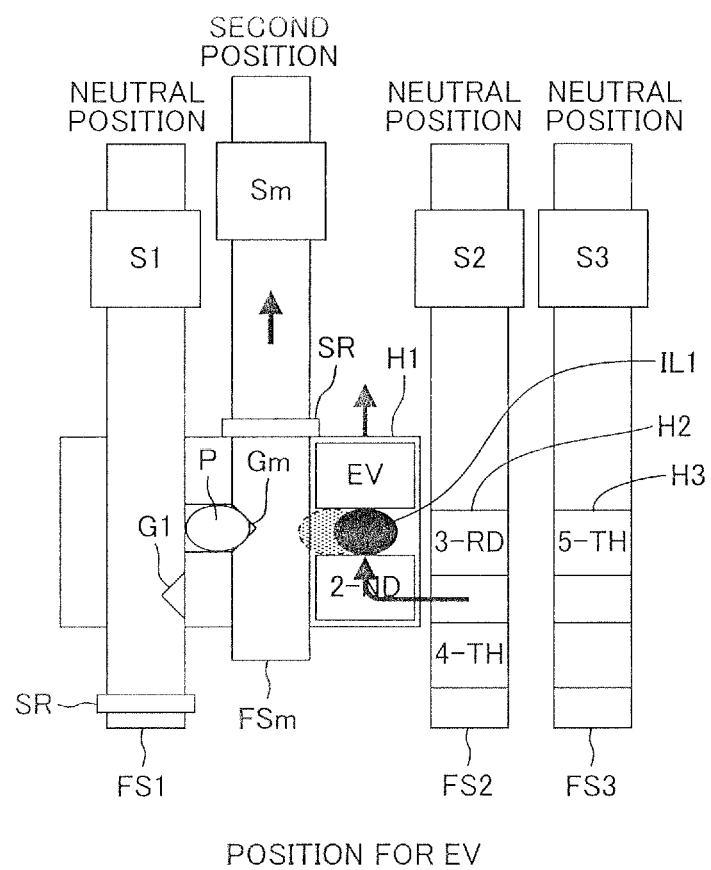
FIG. 6 is a view corresponding to FIG. 2 in a state in which the position for EV is selected.
Figure 7:
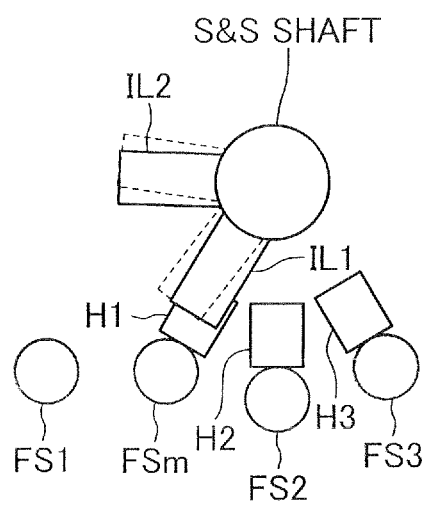
FIG. 7 is a view corresponding to FIG. 3 in a state in which a position for EV or a position for 2-nd is selected.

FIGS. 5 to 7 show a state in which the shift lever SL has moved from the N position to the "shift completion position for EV" (through the "selection position for EV and 2-nd"). When the shift lever SL moves from the "selection position for EV and 2-nd" to the "shift completion position for EV," the head H1 is driven in the "EV" direction (in the upward direction in FIG. 6) as a result of being pushed by the first inner lever IL1 of the S&S shaft (see the first inner lever IL1 depicted in black in FIG. 6). As a result, by the action of the snap ring SR fixed to the changeover shaft FSm, the changeover shaft FSm moves upward in FIG. 6 together with the head H1. Meanwhile, as described above, the fork shaft FS1 is prevented from moving from the "neutral position" toward the upper side of FIG. 6. As a result, while the vertical position of the pin P in the drawing still coincides with that of the groove Gm, the vertical position of the pin P in the drawing deviates from that of the groove G1. Therefore, the pin P moves rightward in FIG. 6 and comes into engagement with the groove Gm only, whereby the changeover shaft FSm is unitarily coupled with the head H1 (the fork shaft FS1 is maintained to be movable relative to the head H1).

Since the changeover shaft FSm is unitarily coupled with the head H1 as described above, when the shift lever SL moves from the "selection position for EV and 2-nd" to the "shift completion position for EV" (accordingly, the head H1 moves upward in FIG. 6), as shown in FIG. 6, the changeover shaft FSm (i.e., the sleeve Sm) moves to a position which is deviated from the "first position" in the upward direction in FIG. 6. In the following description, for the changeover shaft FSm and the sleeve Sm, this position will be referred to as the "second position." All the fork shafts FS1, FS2, and FS3 (i.e., the sleeves S1, S2, and S3) are maintained at their "neutral positions."

As shown in FIG. 5, in this state, the sleeves S1, S2, and S3 do not engage with the corresponding idle gears. Namely, in a state in which the shift lever SL is at the "shift completion position for EV," like the state in which the shift lever SL is at the "N position" (more accurately, the neutral position), no power transmission system is established between the input and output shafts Ai and Ao.

Meanwhile, when the sleeve Sm is located at the "second position" as shown in FIG. 5, the sleeve Sm is in engagement with an idle gear Gm1 provided on the output shaft Ao. The idle gear Gmi is always connected to a fixed gear Gmo provided on the output shaft Ao through idle gears Gm1 and Gm2 provided on the input shaft Ai in a power transmissible manner. Here, a relation (the number of teeth of Gmi)<(the number of teeth of Gm1) and a relation (the number of teeth of Gm2)<(the number of teeth of Gmo) are satisfied. As a result, a power transmission system of the "MG speed reduction ratio>1" is established between the MG shaft Am and the output shaft Ao.

As described above, when the shift lever SL is located at the shift completion position for EV (in the second region of FIG. 4), no power transmission system is established between the input and output shafts Ai and Ao, and the "OUT connected state" of the "MG speed reduction ratio>1" is established. Accordingly, there can be realized a state (namely, "EV travel") in which the vehicle travels by using the MG torque only while maintaining the friction clutch C/T in an engaged state and maintaining the engine E/G in a stopped state (a state in which rotation of the output shaft Ae of the engine E/G stops) (see a thick line in FIG. 5).

EV travel is mainly used so as to start the vehicle. Namely, on the shift pattern, the "position for EV" substantially corresponds to the "position for 1-st" (corresponding to the above-described gear stage for low speed travel). Notably, the neutral position and the shift completion position for EV can be distinguished from each other on the basis of, for example, an output from the shift position sensor P4 or an output from a sensor which detects the position of the S&S shaft.

The state in which the changeover shaft FSm is united with the head H1 is maintained not only when the shift lever SL moves from the "selection position for EV and 2-nd" to the "shift completion position for EV" but also when the shift lever SL returns from the "shift completion position for EV" to the "selection position for EV and 2-nd" after that. Accordingly, as a result of returning of the shift lever SL from the "shift completion position for EV" to the "selection position for EV and 2-nd," the changeover shaft FSm (i.e., the sleeve Sm) returns from the "second position" (see FIG. 6) to the "first position" (see FIG. 2).

Notably, the above-described "movement of the changeover shaft FSm (i.e., the sleeve Sm) at the time when the shift lever SL moves between the selection position for EV and 2-nd to the shift completion position for EV" similarly occurs when the shift lever SL moves between a selection position for R and the shift completion position for R (see the inner lever IL1 indicated by fine dots in FIG. 6 and the inner levers IL1 and IL2 indicated by dashed lines in FIG. 7). Accordingly, when the shift lever SL is at the shift completion position for R (in the second region in FIG. 4), the vehicle can be moved backward by "EV travel" by rotating the motor generator MG in the reverse direction. The shift completion position for EV and the shift completion position for R can also be distinguished from each other on the basis of, for example, the output from the shift position sensor P4 or the output from the sensor which detects the position of the S&S shaft.

<Position for 2-nd>

Figure 8:
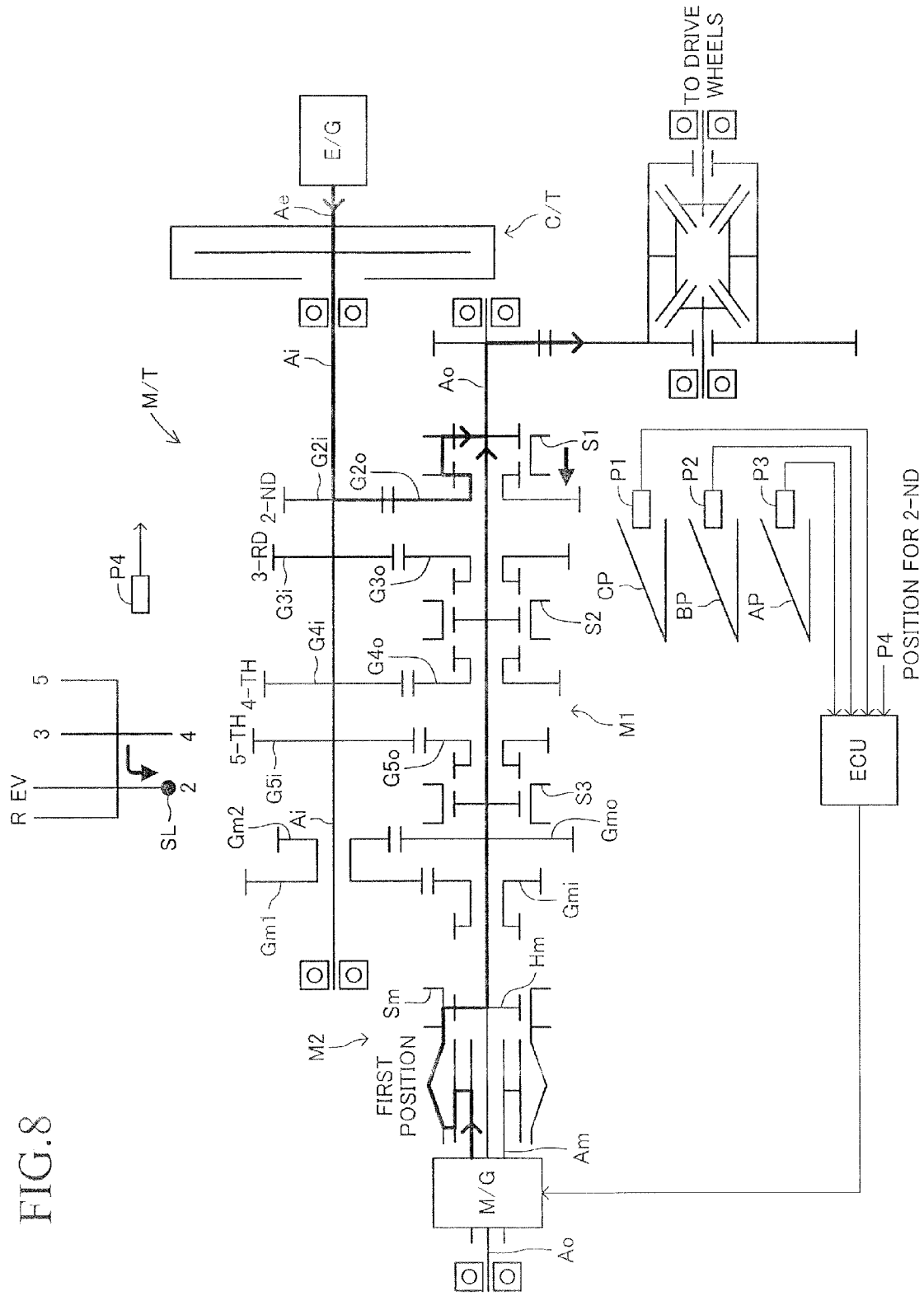
FIG. 8 is a diagram corresponding to FIG. 1 in a state in which the position for 2-nd is selected.
Figure 9:
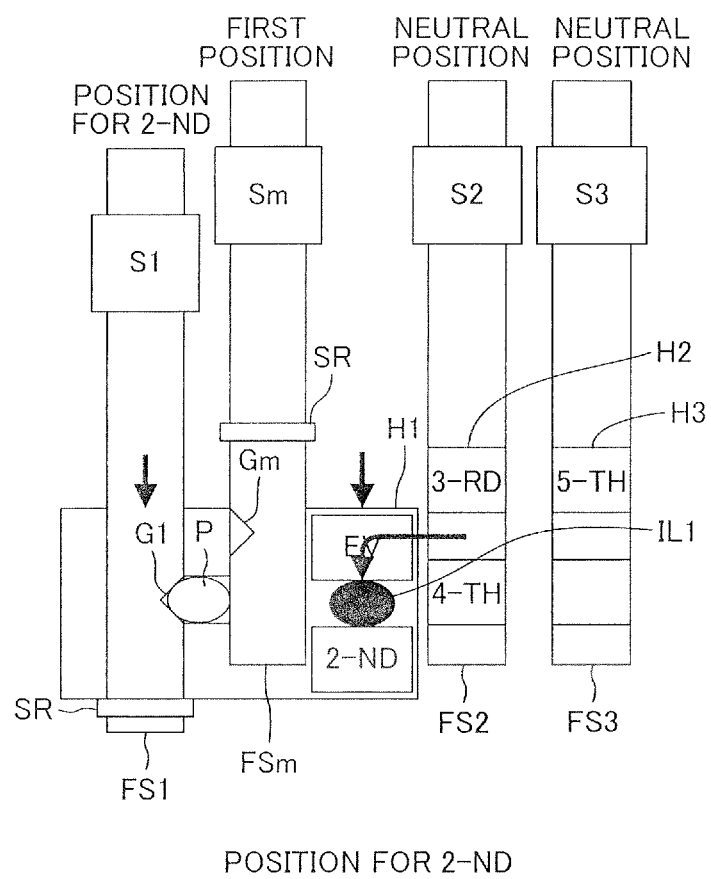
FIG. 9 is a view corresponding to FIG. 2 in a state in which the position for 2-nd is selected.

FIGS. 8 and 9 (and FIG. 7) show a state in which the shift lever SL has moved from the N position to the "shift completion position for 2-nd" (through the selection position for EV and 2-nd). When the shift lever SL moves from the "selection position for EV and 2-nd" to the "shift completion position for 2-nd," the head H1 is driven in the "2-nd" direction (in the downward direction in FIG. 9) as a result of being pushed by the first inner lever IL1 of the S&S shaft (see the first inner lever IL1 depicted in black in FIG. 9). As a result, by the action of the snap ring SR fixed to the fork shaft FS1, the fork shaft FS1 moves downward in FIG. 9 together with the head H1. Meanwhile, as described above, the changeover shaft FSm is prevented from moving from the "neutral position" toward the lower side of FIG. 9. As a result, the vertical position of the pin P in the drawing deviates from that of the groove Gm. Therefore, the pin P moves leftward in FIG. 9 and comes into engagement with the groove G1 only, whereby the fork shaft FS1 is unitarily coupled with the head H1 (the changeover shaft FSm is maintained to be movable relative to the head H1).

Since the fork shaft FS1 is unitarily coupled with the head H1 as described above, when the shift lever SL moves from the "selection position for EV and 2-nd" to the "shift completion position for 2-nd" (accordingly, the head H1 moves downward in FIG. 9), as shown in FIG. 9, the fork shaft FS1 (i.e., the sleeve S1) moves from the "neutral position" to the "second position." The changeover shaft FSm (i.e., the sleeve Sm) is maintained at the "first position," and the fork shafts FS2 and FS3 (i.e., the sleeves S2 and S3) are maintained at their "neutral positions."

As shown in FIG. 8, in this state, the sleeve S1 engages with an idle gear G2o provided on the output shaft Ao. The idle gear G2o is always meshed with a fixed gear G2i provided on the input shaft Ai. As a result, a power transmission system corresponding to "2-nd" is established for EG torque between the input and output shafts Ai and Ao through the "gears G2i and G2o." Namely, the MT speed reduction ratio becomes (the number of teeth of G2o/the number of teeth of G2i) (="2-nd").

In addition, since the sleeve Sm is maintained at the "first position," like the case described in the paragraph <N position>, the "OUT connected state" of the "MG speed reduction ratio=1" is established. Accordingly, there can be realized a state (namely, "HV travel") in which the vehicle travels by using both of the MG torque and the EG torque (see a thick line in FIG. 8).

The state in which the fork shaft FS1 is united with the head H1 is maintained not only when the shift lever SL moves from the "selection position for EV and 2-nd" to the "shift completion position for 2-nd" but also when the shift lever SL returns from the "shift completion position for 2-nd" to the "selection position for EV and 2-nd" after that. Accordingly, as a result of returning of the shift lever SL from the "shift completion position for 2-nd" to the "selection position for EV and 2-nd," the fork shaft FS1 (i.e., the sleeve S1) returns from the "second position" (see FIG. 9) to the "neutral position" (see FIG. 2).

<Position for 3-rd>

Figure 10:
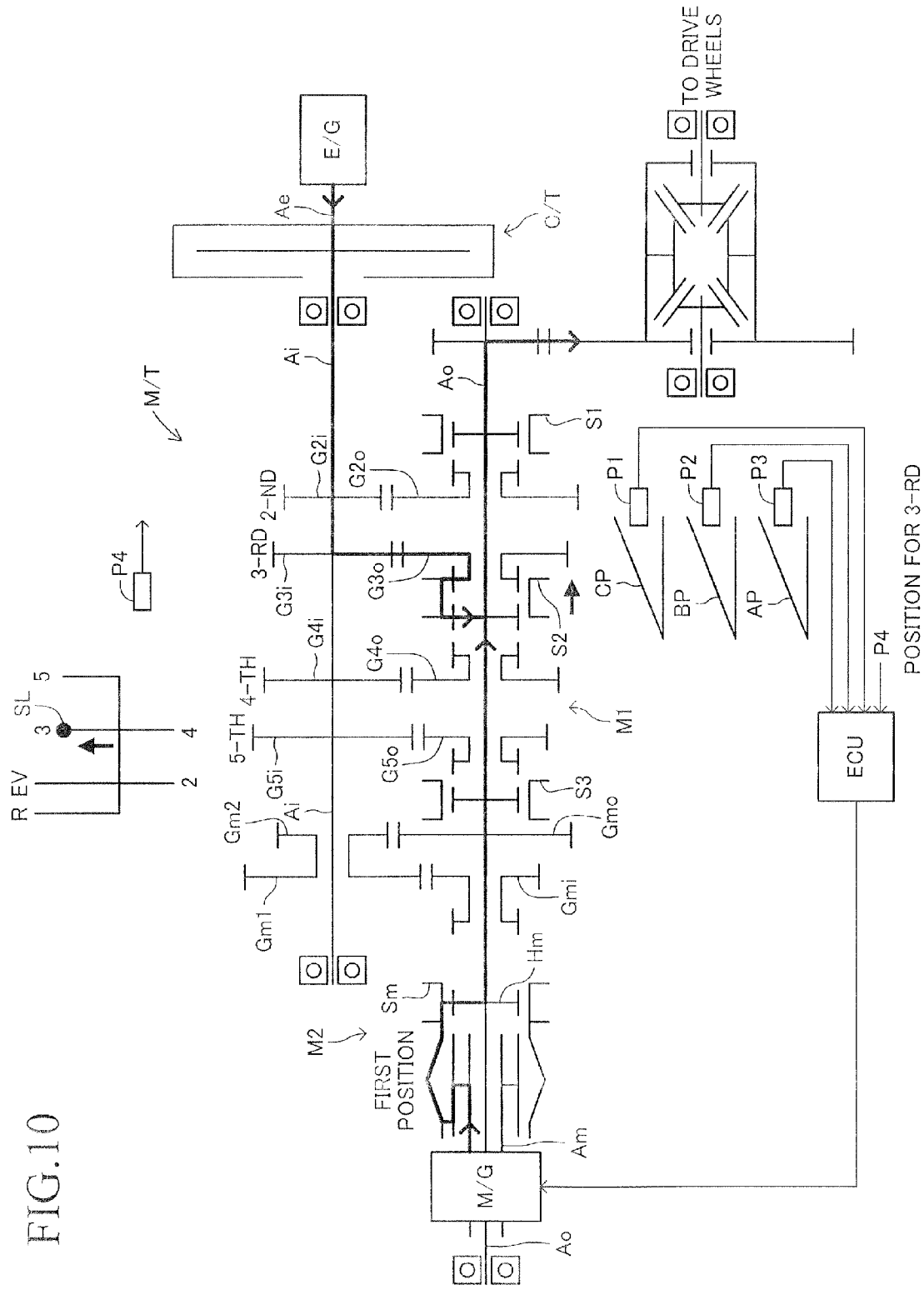
FIG. 10 is a diagram corresponding to FIG. 1 in a state in which a position for 3-rd is selected.
Figure 11:
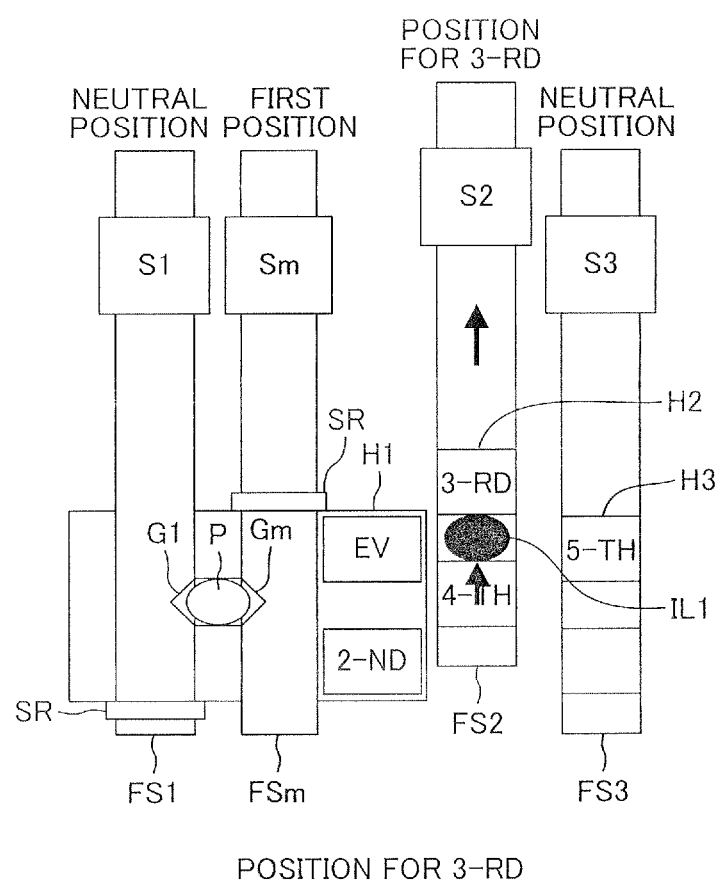
FIG. 11 is a view corresponding to FIG. 2 in a state in which the position for 3-rd is selected.

FIGS. 10 and 11 (and FIG. 3) show a state in which the shift lever SL has moved from the N position to the shift completion position for 3-rd. When the shift lever SL moves from the "N position" to the "shift completion position for 3-rd," a head H2 for 3-rd and 4-th united with the fork shaft FS2 is driven in the "3-rd" direction (in the upward direction in FIG. 11) as a result of being pushed by the first inner lever IL1 of the S&S shaft (see the first inner lever IL1 depicted in black in FIG. 11). As a result, the fork shaft FS2 (i.e., the sleeve S2) moves from the "neutral position" to the "position for 3-rd." The changeover shaft FSm (i.e., the sleeve Sm) is maintained at the "first position," and the fork shafts FS1 and FS3 (i.e., the sleeves S1 and S3) are maintained at their "neutral positions."

As shown in FIG. 10, in this state, the sleeve S2 engages with an idle gear G3o provided on the output shaft Ao. The idle gear G3o is always meshed with a fixed gear G3i provided on the input shaft Ai. As a result, a power transmission system corresponding to "3-rd" is established for EG torque between the input and output shafts Ai and Ao through the "gears G3i and G3o." Namely, the MT speed reduction ratio becomes (the number of teeth of G3o/the number of teeth of G3i) (="3-rd").

In addition, since the sleeve Sm is maintained at the "first position," the "OUT connected state" of the "MG speed reduction ratio=1" is established. Accordingly, there can be realized a state (namely, "HV travel") in which the vehicle travels by using both of the MG torque and the EG torque (see a thick line in FIG. 10).

<Position for 4-th>

Figure 12:
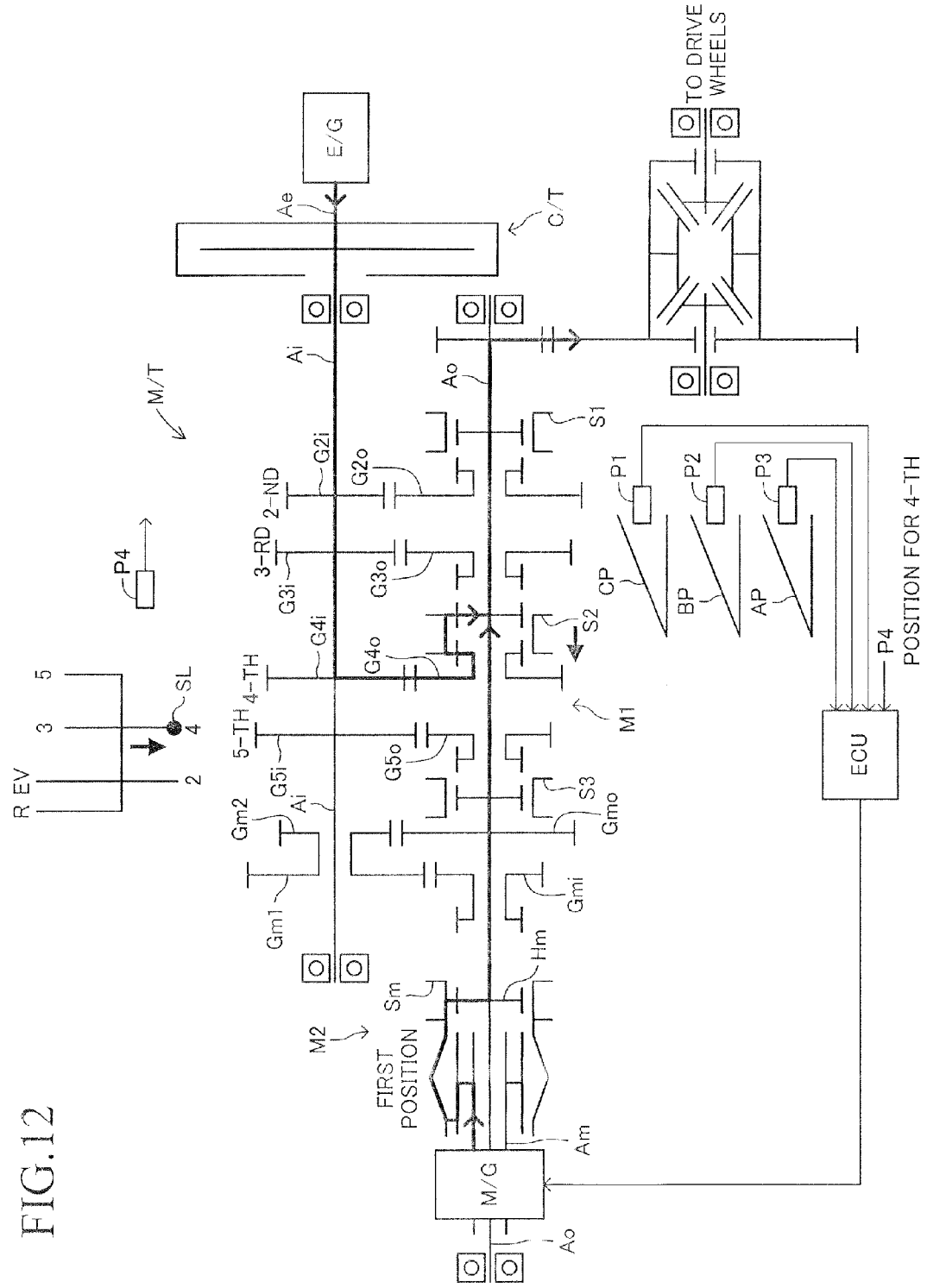
FIG. 12 is a diagram corresponding to FIG. 1 in a state in which a position for 4-th is selected.
Figure 13:
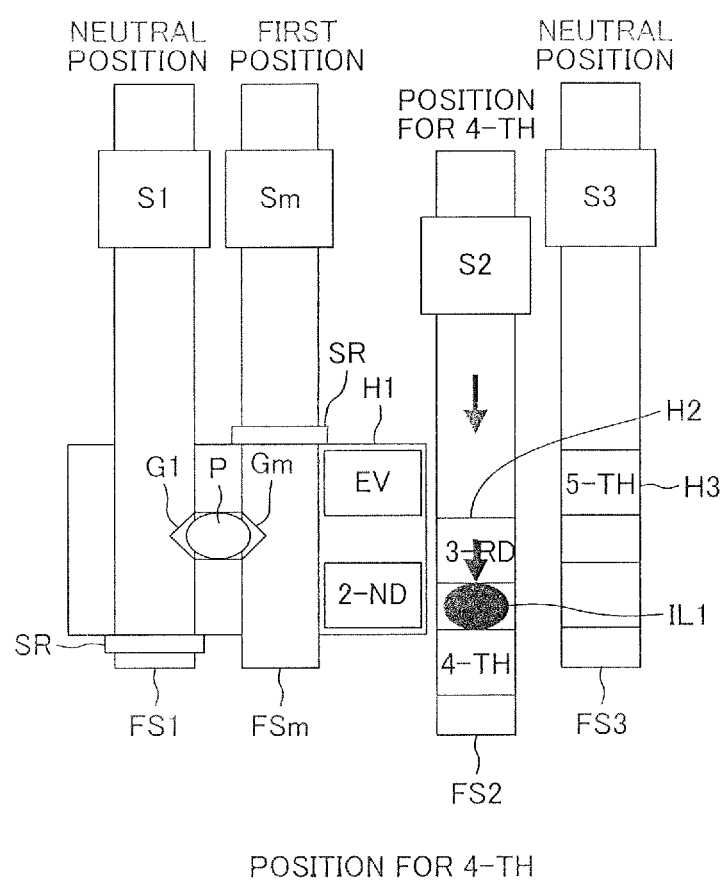
FIG. 13 is a view corresponding to FIG. 2 in a state in which the position for 4-th is selected.

FIGS. 12 and 13 (and FIG. 3) show a state in which the shift lever SL has moved from the N position to the shift completion position for 4-th. Since the operation in this case is similar to the operation described in the paragraph <Position for 3-rd>, the details of the operation will not be described. In this state, a power transmission system corresponding to "4-th" is established for EG torque between the input and output shafts Ai and Ao through "gears G4i and G4o." Namely, the MT speed reduction ratio becomes (the number of teeth of G4o/the number of teeth of G4i) (="4-th"). In addition, the "OUT connected state" of the "MG speed reduction ratio=1" is realized. Accordingly, there can be realized a state (namely, "HV travel") in which the vehicle travels by using both of the MG torque and the EG torque (see a thick line in FIG. 12).

<Position for 5-th>

Figure 14:
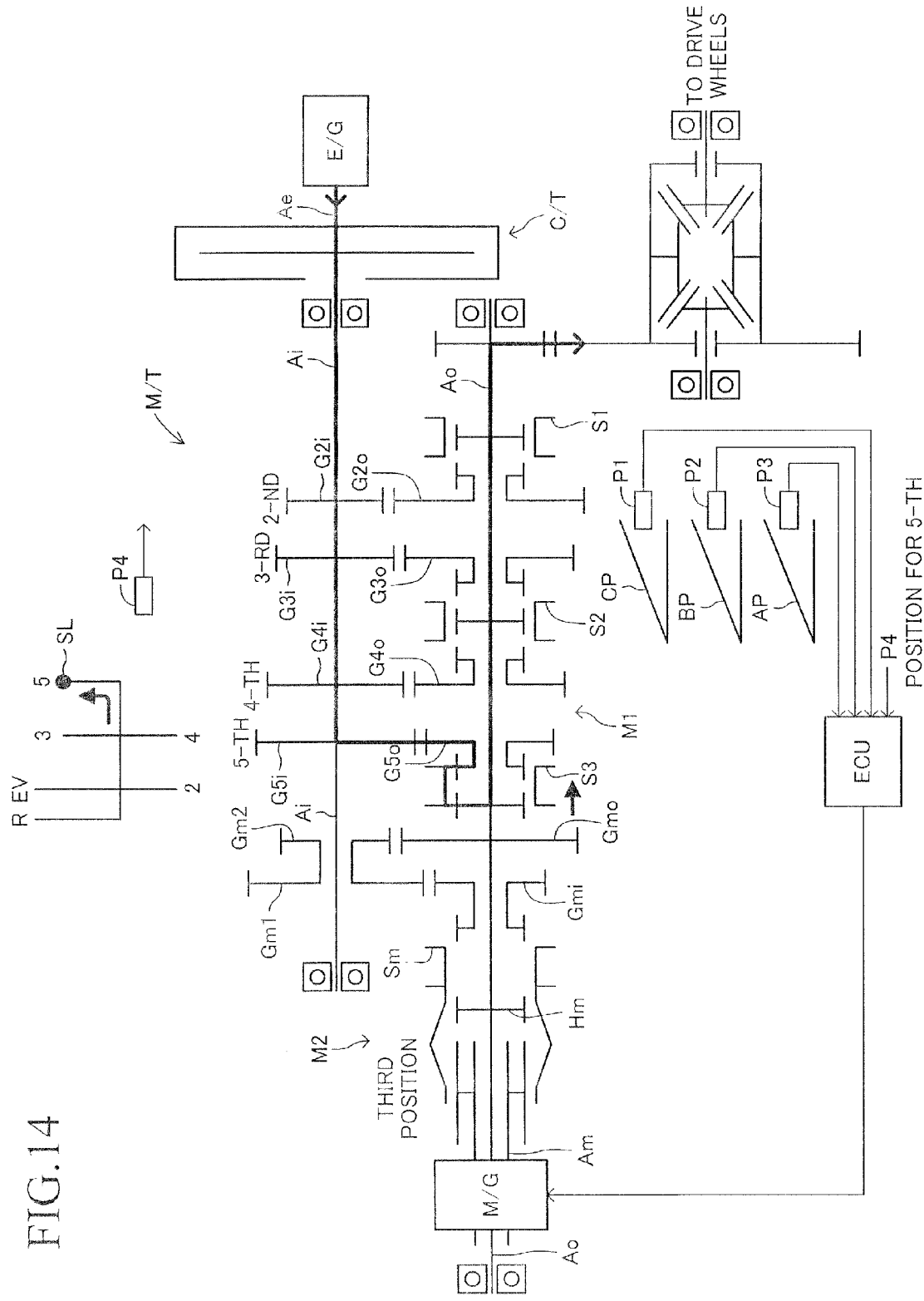
FIG. 14 is a diagram corresponding to FIG. 1 in a state in which a position for 5-th is selected.
Figure 15:
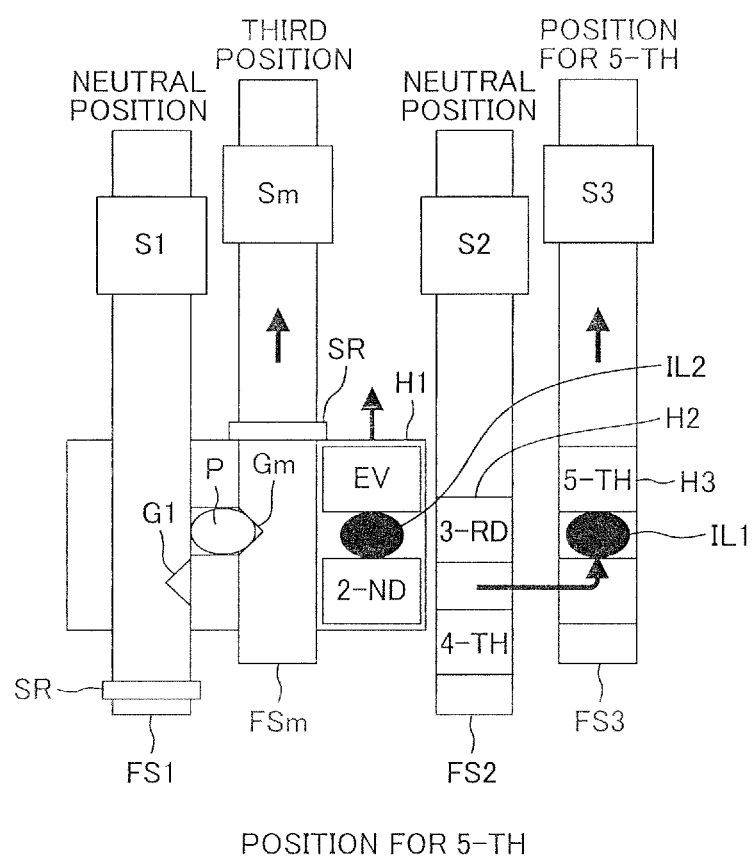
FIG. 15 is a view corresponding to FIG. 2 in a state in which the position for 5-th is selected.
Figure 16:
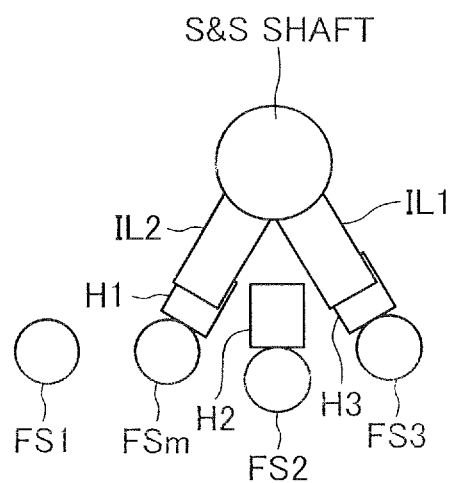
FIG. 16 is a view corresponding to FIG. 3 in a state in which the position for 5-th is selected.

FIGS. 14 to 16 show a state in which the shift lever SL has moved from the N position to the "shift completion position for 5-th.", When the shift lever SL moves from the "selection position for 5-th" to the "shift completion position for 5-th," a head H3 for 5-th united with the fork shaft FS3 is driven in the "5-th" direction (in the upward direction in FIG. 15) as a result of being pushed by the first inner lever IL1 of the S&S shaft (see the first inner lever IL1 depicted in black in FIG. 15). As a result, the fork shaft FS3 (i.e., the sleeve S3) moves from the "neutral position" to the "position for 5-th."

In addition, as shown in FIG. 16, in the state in which the shift lever SL is located at the "selection position for 5-th," the second inner lever IL2 of the S&S shaft engages with the head H1. Accordingly, the head H1 is also driven in the "EV" direction (in the upward direction in FIG. 15) as a result of being pushed by the second inner lever IL2 (see the second inner lever IL2 depicted in black in FIG. 15). As a result, the changeover shaft FSm is unitarily coupled with the head H1, whereby, as shown in FIG. 15, the changeover shaft FSm (i.e., the sleeve Sm) also moves to the position which is deviated from the "first position" in the upward direction in FIG. 15. In the following description, for the changeover shaft FSm and the sleeve Sm, this position will be referred to as the "third position."

As can be understood from FIG. 4, on the shift pattern, the distance between the selection position for 5-th and the shift completion position for 5-th is shorter than the distance between the selection position for EV and 2-nd and the shift completion position for EV. Because of this, the "third position" is located between the "first position" and the "second position." Notably, the fork shafts FS1 and FS2 (i.e., the sleeves S1 and S2) are maintained at their "neutral positions."

As shown in FIG. 14, in this state, the sleeve S3 engages with an idle gear G5o provided on the output shaft Ao. As a result, a power transmission system corresponding to "5-th" is established for EG torque between the input and output shafts Ai and Ao through the "gears G5i and G5o." Namely, the MT speed reduction ratio becomes (the number of teeth of G5o/the number of teeth of G5i) (="5-th").

Meanwhile, when the sleeve Sm is located at the "third position" as shown in FIG. 14, the sleeve Sm engages with neither the hub Hm nor the idle gear Gmi. Namely, no power transmission system is established between the MG shaft Am and the output shaft Ao. As described above, when the shift lever SL is located at the shift completion position for 5-th (in the third region of FIG. 4), there can be realized a state (namely, "EG travel") in which the vehicle travels by using the EG torque only while maintaining the motor generator M/G in a stopped state (a state in which rotation of the MG shaft Am stops) (see a thick line in FIG. 14).

As described above, in the case where the shift lever SL is located at the "shift completion position for EV" (namely, the "gear stage for low speed travel" is established), no power transmission system is established between the input and output shafts Ai and Ao, and the "OUT connected state" of the "MG speed reduction ratio >1" is established. Accordingly, EV travel utilizing a large MG speed reduction ratio becomes possible. Also, in the case where the shift lever SL is located at the "shift completion position for 2-nd, 3-rd, or 4-th" (namely, the "gear stage for intermediate speed travel" is established), a power transmission system is established between the input and output shafts Ai and Ao, and the "OUT connected state" of the "MG speed reduction ratio=1" is established. Accordingly, HV travel becomes possible. Also, in the case where the shift lever SL is located at the "shift completion position for 5-th" (namely, the "gear stage for high speed travel" is established), a power transmission system is established between the input and output shafts Ai and Ao, and no power transmission system is established between the MG shaft Am and the output shaft Ao. Accordingly, EG travel becomes possible.

Notably, in the case where the shift lever SL is located at the "shift completion position for 2-nd, 3-rd, 4-th, or 5-th," a power transmission system corresponding to "N-th" is established between the input shaft Ai and the output shaft Ao through "gears GNi and GNo" (N: 2 to 5). At this time, the MT speed reduction ratio is represented by (the number of teeth of GNo/the number of teeth of GNi) (="N-th") (N: 2 to 5). The MT speed reduction ratio decreases gradually from "2-nd" toward "5-th."

As described above, the manual transmission M/T includes an MT speed change mechanism M1 which can selectively set the MT speed reduction ratio to four values corresponding to "2-nd" to "5-th." The MT speed change mechanism M1 is composed of the fixed gears GNi, the idle gears GNo, the sleeves S1 to S3, and the fork shafts FS1 to FS3, etc. (N: 2 to 5). Also, the manual transmission M/T includes an MG connection changeover mechanism M2 which can selectively realize three states of connection between the MG shaft Am and the output shaft Ao; i.e., a state in which the MG shaft Am and the output shaft Ao are connected such that the "MG speed reduction ratio becomes greater than 1," a state in which the MG shaft Am and the output shaft Ao are connected such that the "MG speed reduction ratio becomes 1," and a state in which the MG shaft Am and the output shaft Ao are not connected. The MG connection changeover mechanism M2 is composed of the sleeve Sm, the changeover shaft FSm, the hub Hm, the gears Gmi, Gm1, Gm2, and Gmo, etc.

(Control of the Engine E/G)

The control of the engine E/G by the present apparatus is generally performed as follows. When the vehicle is stopped or "N" or "EV" is selected, the engine E/G is maintained in a stopped state (a state in which fuel injection is not performed). When a gear stage for I-IV travel (any of "2-nd" to "4-th") is selected in a state in which the engine E/G is stopped, the engine E/G is started (fuel injection is started). In periods during which the engine E/G is operating (fuel injection is being performed), the EG torque is controlled on the basis of the accelerator opening, etc. When "N" or "EV" is selected or the vehicle stops in a state in which the engine E/G is operating, the engine E/G is changed to the stopped state.

(Control of the Motor Generator M/G)

The control of the motor generator M/G by the present apparatus is generally performed as follows. When the vehicle is stopped or when "N" or "5-th is selected, the motor generator M/G is maintained in a stopped state (the MG torque=0). When "EV" is selected in a state in which the motor generator M/G is in the stopped state, normal start control utilizing the MG torque is started. In the normal start control, the MG torque is controlled on the basis of the accelerator opening and the clutch stroke. The MG torque in the normal start control is determined by making use of a map or the like which is previously prepared for the case where an "ordinary vehicle which includes a manual transmission and a friction clutch and which includes an internal combustion engine only as a power source" is started in "1-st" and which defines the relation between "accelerator opening and clutch stroke" and "torque of the internal combustion engine transmitted to the input shaft of the manual transmission via the clutch" at the time of start of the vehicle. After completion of the normal start control, the MG torque is controlled on the basis of the accelerator opening, etc. when "EV" is selected or one of "2-nd" to "4-th" (the plurality of gear stages for HV travel) is selected. When the vehicle stops, the motor generator M/G is changed to the stopped state.

(Action and Effects)

As described above, in the manual transmission M/T according to the embodiment of the present invention, at the time of low speed travel (namely, when the gear stage for low speed travel (EV) is selected), the MG speed reduction ratio is set to a larger value. Accordingly, the MG torque is transmitted to the output shaft Ao (accordingly, the drive wheels) while being amplified to a sufficient degree. Therefore, the size of the motor generator M/G can be reduced.

In addition, at the time of high speed travel (namely, when the gear stage for high speed travel (5-th) is selected), the power transmission system between the MG shaft Am and the output shaft Ao is interrupted. Accordingly, heat generation of the motor generator M/G due to high speed rotation of the MG shaft Am can be suppressed. Namely, the size of the motor generator M/G can be reduced, and heat generation of the motor generator M/G due to high speed rotation can be suppressed.

The present invention is not limited to the above-described embodiment, and various modifications may be employed without departing from the scope of the present invention. For example, in the above-described embodiment, all the sleeves S1, S2, and S3 (and idle gears corresponding thereto) are provided on the output shaft Ao. However, all the sleeves S1, S2, and S3 (and idle gears corresponding thereto) may be provided on the input shaft Ai. Alternatively, some of the sleeves S1, S2, and S3 (and idle gears corresponding thereto) may be provided on the output shaft Ao, and the remaining sleeve(s) (and an idle gear(s) corresponding thereto) may be provided on the input shaft Ai.

In the above-described embodiment, one of the plurality of gear stages is a "gear stage (other than the neutral) in which no power transmission system is established between the input and output shafts" (EV). However, the embodiment may be modified such that all of the plurality of gear stages are "gear stages" in which a power transmission system is established between the input and output shafts." In this case, "EV" is changed to "1-st" and HV travel is possible in all the gear stages of 1-th through 5-th.

In above-described embodiment, the "first speed reduction ratio" and the "second speed reduction ratio" for the "motor speed reduction ratio" (the first speed reduction ratio>the second speed reduction ratio) are determined such that the "first speed reduction ratio>1" and the "second speed reduction ratio=1." However, the "first speed reduction ratio" and the "second speed reduction ratio" may be determined such that the "first speed reduction ratio=A" and the "second speed reduction ratio=B" (A>B>1, A>1>B, 1>A>B).

The invention claimed is:

1. A manual transmission (M/T) having no torque converter, which is applied to a vehicle including an internal combustion engine (E/G) and a motor generator (M/G) as power sources, the manual transmission comprising:
an input shaft (Ai) to which power is input from the internal combustion engine;
an output shaft (Am) of the motor generator which is selectively coupled to an output shaft (Ao) of the manual transmission (M/T) to which power is selectively input from at least one of the motor generator (M/G) and the internal combustion engine (E/G) and from which power is output to a drive wheel of the vehicle;
a transmission speed change mechanism (M1) which establishes each of a plurality of gear stages comprising: a gear stage for low speed travel, a plurality of gear stages for intermediate speed travel, and a gear stage for high speed travel when a shift operation member (SL) operated by a driver moves on a shift pattern to a shift completion position of a corresponding gear stage, and
the manual transmission being characterized by comprising a connection changeover mechanism (M2), wherein
when the gear stage for low speed travel (EV) is established, the connection changeover mechanism realizes a first state in which a power transmission system is established between the output shaft (Ao) of the manual transmission (M/T) and the output shaft (Am) of the motor generator (M/G) and a motor speed reduction ratio, which is the ratio of rotational speed of the output shaft of the motor generator (M/G) to that of the output shaft of the manual transmission (M/T), is set to a first speed reduction ratio;

when one of the plurality of gear stages for intermediate speed travel which is used for traveling at higher speed as compared with the gear stage for low speed travel is established, the connection changeover mechanism realizes a second state in which a power transmission system is established between the output shaft (Ao) of the manual transmission (M/T) and the output shaft (Am) of the motor generator (M/G) and the motor speed reduction ratio is set to a second speed reduction ratio smaller than the first speed reduction ratio; and when the gear stage for high speed travel which is used for traveling at higher speed as compared with the gear stages for intermediate speed travel is established, the connection changeover mechanism realizes a third state in which the power transmission system between the output shaft (Ao) of the manual transmission (MT) and the output shaft (Am) of the motor generator (M/G) is interrupted and no power transmission system can be established between the output shaft (Ao) of the manual transmission (M/T) and the output shaft (Am) of the motor generator (M/G), wherein the transmission speed change mechanism has, as the gear stage for low speed travel, a single gear stage for motor travel, which is used for traveling by using a drive force of the motor generator (M/G) only and in which no power transmission system is established between the input shaft (Ai) of the manual transmission (M/T) and the output shaft (Ao) of the manual transmission (M/T);

the transmission speed change mechanism has, as the plurality of gear stages for intermediate speed travel, a plurality of gear stages for hybrid travel, which are used for traveling in a state in which both of a drive force of the internal combustion engine and the drive force of the motor generator (M/G) can be used, and in which a power transmission system is established between the input shaft (Ai) of the manual transmission (M/T) and the output shall (Ao) of the manual transmission (M/T); and the transmission speed change mechanism has, as the gear stage for high speed travel a single gear stage for internal combustion engine travel, which is used for traveling in a state in which only the drive force of the internal combustion engine can be used, and in which a power transmission system is established between the input shaft (Ai) of the manual transmission (M/T) and the output shaft (Ao) of the manual transmission (M/T) and a transmission speed reduction ratio, which is the ratio of rotational speed of the input shall (Ai) of the manual transmission (M/T) to that of the output shalt (Ao) of the manual transmission (M/T), is smaller as compared with the gear stages for intermediate speed travel, and wherein the transmission speed change mechanism comprises:

a plurality of fixed gears (G2$i$, G3$i$, G4$i$, G5$i$) which are non-rotatably provided on one of the input shaft (Ai) and the output shaft (Ao) of the manual transmission (M/T) and which correspond to the plurality of gear stages for hybrid travel;

a plurality of idle gears (G2$o$, G3$o$, G4$o$, G5$o$) which are rotatably provided on one of the input shaft (Ai) and the output shaft (Ao) of the manual transmission (M/T), which correspond to the plurality of gear stages for hybrid travel, and which are always meshed with the fixed gears of the corresponding gear stages for hybrid travel;

a plurality of sleeves (S1, S2, S3) which are non-rotatably and axially movably provided on the corresponding shaft of the input and output shafts (Ai, Ao) of the manual transmission (M/T) and each of which can be engaged with the corresponding idle gear of the plurality of idle gears so as to fix the corresponding idle gear to the corresponding shaft such that the corresponding idle gear cannot rotate relative to the corresponding shaft;

a plurality of fork shafts (ES1, ES2, ES3) each of which is connected to a corresponding one of the plurality of sleeves and can move in an axial direction thereof; and a shift and selection shalt which is one of moved in an axial direction thereof and rotated about its axis as a result of a selection operation of the shift operation member, which is an operation on the shift pattern in a left-right direction of the vehicle, and is one of rotated about its axis and moved in the axial direction as a result of a shift operation of the shift operation member, which is an operation on the shift pattern in a front-rear direction of the vehicle, wherein a corresponding fork shaft is selected from the plurality of fork shafts by the selection operation of the shift operation member, and a first inner lever (IL1) projecting from a side surface of the shift and selection shaft pushes and moves the elected fork shaft in the axial direction thereof as a result of the shift operation of the shift operation member, whereby the corresponding gear stage is realized;

the connection changeover mechanism includes a changeover shaft (FSm) which is pushed and moved in the axial direction by the first inner lever (IL1) and a second inner lever (IL2) projecting from the side surface of the shift and selection shaft, the second state being realized when the changeover shaft is located at a first axial position, the first state being realized when the changeover shaft is located at a second axial position, and the third state being realized when the changeover shaft is located at a third axial position;

the changeover shaft is maintained at the first axial position when the shift operation member is located, on the shift pattern, at a neutral position which differs from the shift completion position of the gear stage for low speed travel and in which no power transmission system is established between the input and output shafts of the manual transmission (M/T), and when the shift operation member is located, on the shift pattern, at the shift completion position of the gear stage for intermediate speed travel;

when the shift operation member moves from the neutral position to the shift completion position of the gear stage for low speed travel as a result of the shill operation, the changeover shaft moves from the first axial position to the second axial position as a result of being pushed by the first inner lever (IL1); and when the shift operation member moves from the neutral position to the shift completion position of the gear stage for high speed travel as a result of the shift operation, the changeover shaft moves from the first axial position to the third axial position as a result of being pushed by the second inner lever (IL2).

2. The manual transmission according to claim 1, wherein the connection changeover mechanism comprises:

a movement member (H1) which axially movably receives the changeover shaft (FSm) and a specific fork shaft (FS1) which is one of the plurality of fork shafts, which corresponds to a specific gear stage (2-nd) having a largest transmission speed reduction ratio among the gear stages for intermediate speed travel, and which is disposed parallel to the changeover shaft, the movement member being pushed and moved toward one side in the axial direction by the first inner lever (IL1) when the shift operation member moves from the neutral position to the shift completion position of the gear stage for low speed travel as a result of the shift operation, the movement member being pushed and moved toward the other side in the axial direction by the first inner lever (IL1) when the shift operation member moves from the neutral position to the shift completion position of the specific gear stage as a result of the shift operation, and the movement member being pushed and moved toward the one side in the axial direction by the second inner lever (IL2) when the shift operation member moves from the neutral position to the shift completion position of the gear stage for high speed travel as a result of the shift operation; and a connection mechanism (SR, P, G1, Gm) which unitarily connects the movement member to the changeover shaft when the shift operation member moves between the neutral position and the shift completion position of the gear stage for low speed travel and when the shift operation member moves between the neutral position and the shift completion position of the gear stage for high speed travel, and which unitarily connects the movement member to the specific fork shaft when the shift operation member moves between the neutral position and the shift completion position of the specific gear stage.

* * * * *